(12) United States Patent
Irazabal (10) Patent No.: US 11,308,030 B2
(45) Date of Patent: Apr. 19, 2022

(54) LOG-STRUCTURED MERGE-TREE WITH BLOCKCHAIN PROPERTIES

(71) Applicant: International Business Machines Corporation, Armonk, NY (US)

(72) Inventor: Jeronimo Irazabal, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 16/809,697

(22) Filed: Mar. 5, 2020

(65) Prior Publication Data

US 2021/0279205 A1 Sep. 9, 2021

(51) Int. Cl.
*G06F 16/13* (2019.01)
*G06F 21/62* (2013.01)
*G06F 21/60* (2013.01)
*G06F 16/22* (2019.01)
*G06F 16/14* (2019.01)

(52) U.S. Cl.
CPC ......... *G06F 16/137* (2019.01); *G06F 16/152* (2019.01); *G06F 16/2246* (2019.01); *G06F 21/602* (2013.01); *G06F 21/6218* (2013.01); *G06F 2221/0751* (2013.01)

(58) Field of Classification Search
None
See application file for complete search history.

(56) References Cited

U.S. PATENT DOCUMENTS

| | | | | |
|---|---|---|---|---|
| 2017/0364700 A1* | 12/2017 | Goldfarb | ............. | G06F 21/6218 |
| 2019/0034427 A1* | 1/2019 | Trika | ...................... | G06F 16/21 |
| 2020/0167345 A1* | 5/2020 | Zhuo | .................. | G06F 16/2246 |
| 2020/0320081 A1* | 10/2020 | Fanghaenel | ........... | G06F 16/172 |
| 2021/0004177 A1* | 1/2021 | Lee | ........................ | G06F 3/0679 |
| 2021/0081396 A1* | 3/2021 | Tian | ...................... | G06F 3/0685 |

OTHER PUBLICATIONS

Raju et al., "mlsm: Making Authenticated Storage Faster in Ethereum," 10th {USENIX} Workshop on Hot Topics in Storage and File Systems (HotStorage 18), 2018, 6 pages.
Tang et al., "Lightweight Blockchain Logging for Data-Intensive Applications," International Conference on Financial Cryptography and Data Security, pp. 308-324, Springer, Berlin, Heidelberg, 2018.

* cited by examiner

*Primary Examiner* — Eddy Cheung (57) ABSTRACT

An example operation may include one or more of storing data within a temporary memory structure, transferring the stored data from the temporary memory structure into a set of files of a log-structured merge-tree, generating a respective sequence of hashes within each file of the set of files, where the respective sequence of hashes provides proof of a sequential order in which data values are stored within the respective file, and storing the sequences of hashes in storage.

17 Claims, 9 Drawing Sheets

LOG-STRUCTURED MERGE-TREE WITH BLOCKCHAIN PROPERTIES

TECHNICAL FIELD

This application generally relates to data storage, and more particularly, to a process in which a log-structured merge-tree is modified with blockchain properties and which can preserve the blockchain properties during a merge operation.

BACKGROUND

Blockchain systems store data on an immutable ledger, provide distributed and decentralized access to the immutable ledger through non-trusting participants, establish consensus requirements for agreement between the non-trusting participants such that no one entity can change the immutable ledger without agreement from others, invoke smart contracts, and the like. A blockchain is typically formed by a network of participants which agree to add a block (with data stored therein) to the immutable ledger. Before being added, the block is linked to a previous block on the immutable ledger thereby forming a chain. This immutable and incorruptible nature of blockchain makes it safe from falsified information and hacks. The decentralized nature also gives it the unique quality of being trustless, in that parties do not need to establish trust before they can transact safely.

Meanwhile, a key-value store (also referred to as a key-value database) is a type of non-relational database that uses a simple key-value method to store data. Within the key-value store, data is stored as a collection of key-value pairs where the key serves as a unique identifier. Both the keys and the values can be various types of data items or combination of data items, ranging from simple objects to complex compound objects. Typically, the key-value store keeps only a current value (most recent state) of a key-value pair.

In some cases, the storage architecture of a key-value store is a log-structured merge-tree (LSM). In LSM architecture, small batches of data such as arbitrary streams of key-values are saved into files. The files are created and stored sequentially and typically cover data from a client (e.g., application, service, program, etc.) over short periods of time. Each file may be sorted before being written, making it easier to search.

SUMMARY

One example embodiment may provide an apparatus that includes one or more of a storage configured to store data within a temporary memory structure, and a processor configured to one or more of transfer the stored data from the temporary memory structure into a set of files of a log-structured merge-tree, generate a respective sequence of hashes within each file of the set of files, where the respective sequence of hashes provides proof of a sequential order in which data values are stored within the respective file, and store the sequences of hashes in the storage.

Another example embodiment may provide a method that includes one or more of storing data within a temporary memory structure, transferring the stored data from the temporary memory structure into a set of files of a log-structured merge-tree, generating a respective sequence of hashes within each file of the set of files, where the respective sequence of hashes provides proof of a sequential order in which data values are stored within the respective file, and storing the sequences of hashes in storage.

A further example embodiment may provide a non-transitory computer readable medium comprising instructions, that when read by a processor, cause the processor to perform one or more of storing data within a temporary memory structure, transferring the stored data from the temporary memory structure into a set of files of a log-structured merge-tree, generating a respective sequence of hashes within each file of the set of files, where the respective sequence of hashes provides proof of a sequential order in which data values are stored within the respective file, and storing the sequences of hashes in storage.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A log-structured merge-tree (LSM) is fairly simple data structure. Instead of a data store having one large index, chunks of data are saved in smaller index files. For example, a string of writes (and the resulting key-value pairs) may be stored in a file in tabular format. Here, a respective key uniquely identifies a respective data item within the file. Meanwhile, the respective value paired with the key can be a byte array, data structure, binary large object (BLOB), text, numeral, or the like.

The log-structured merge-tree may be a logical tree that is split into several levels or layers. Incoming data may initially be stored in a memory table (file) that is logically disposed in an upper level of the tree. The memory table may be an in-memory storage also referred to as a random access memory (RAM). When the memory table fills up (i.e., the in-memory table reaches its threshold size), a new in-memory table is created and the filled-up table may be moved/transferred to a file on disk which is considered a lower layer of the tree. Once written to disk, the files are read-only, though they may be merged in a background with other files to reduce the size/cost of the data reads. The merged files (table data) may be logically disposed even further lower in the tree.

A background thread may be opened within the database for each active LSM tree. The thread may be responsible for writing data from the in-memory table to the disk and for merging files of data together on disk. Merges, also referred to as compaction, may be performed periodically, automatically, etc., and may be triggered by a database.

Each file may also include its own index which keeps an entry for each key in the table as well as a location (e.g., an offset) where the corresponding value is located within the table. For files that have been transferred to disk, the index may be kept in-memory to increase/improve read time.

According to various embodiments, blockchain attributes can be embedded within a log-structured merge-tree. For example, each file on disk may be linked to a previous file on disk based on a sequence in which the files were created. In other words, a new file may be linked to an immediately previous file in the sequence by storing a hash value of the immediately previous file within the new file. The hash linking process may be repeated throughout the sequence/chain of files creating a hashed-link chain of sequential files on disk. The hash may be generated through a tree-hash structure. In this case, each key value may be hashed, and paired or otherwise combined with adjacent hashes to create additional hashes. Through this process, the sequence of hashes may be rolled up into a root hash. The root hash may be the hash that is stored in the next file on disk.

Some of the benefits of embedding the blockchain attributes with the log-structured merge-tree include providing immutable proof to the order of files in the data store. This can be helpful for document data stores, account transaction ledgers, and the like. Furthermore, by embedding blockchain properties within the log-structured merge-tree the security of the data store is greatly improved because an order of the data is ensured.

The example embodiments also provide a mechanism for preserving a sequence of hashes corresponding to a sequence of key-values within the two files when the two files are merged together. For example, when a merge operation is performed between two files, and one or more key-values are removed from one or both of the files, the system can preserve proof that the remaining key values are from the original file by creating a new sequence of hashes based on the previous sequence of hashes. Thus, the system can maintain cryptographic proof of the two files and the content therein even after the merge.

Figure 1A:
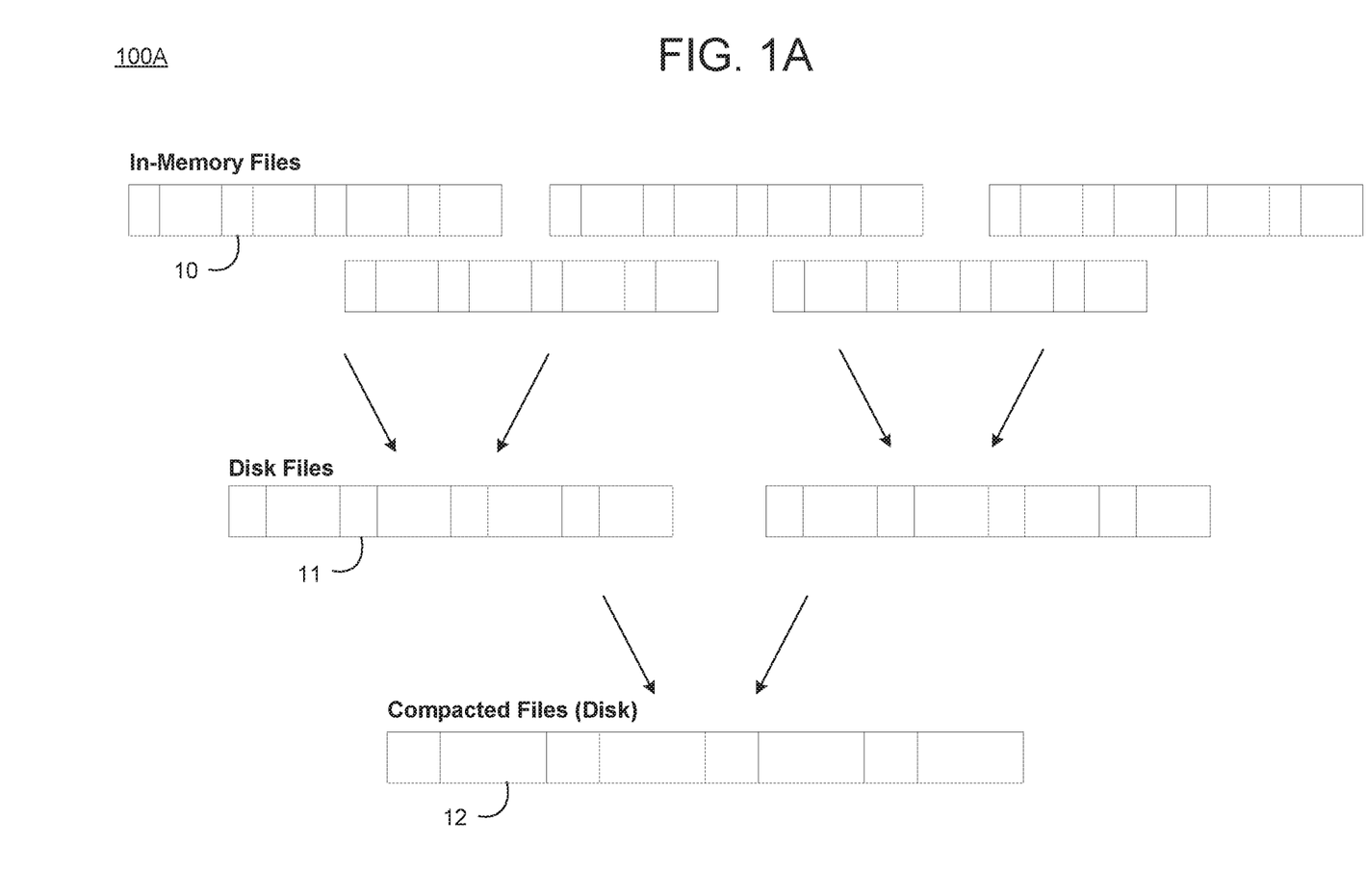
FIG. 1A is a diagram illustrating a log-structured merge-tree according to example embodiments.

FIG. 1A illustrates a log-structured merge-tree 100A data structure according to example embodiments. Referring to FIG. 1A, the LSM 100A includes a tree-like data structure with a top layer of the tree including in-memory files 10. The LSM 100A may be included within a database such as a key-value store or the like. The in-memory files 10 may store strings, rows, arrays, etc. of key-value pairs. The in-memory files 10 may have a threshold size. When the threshold size is reached, an in-memory file 10 may be transferred to disk (disk file 11), and a new in-memory file 10 may be created. Thus, the new data entries are initially stored within the in-memory files 10 and subsequently pushed to disk files 11.

Figure 1B:
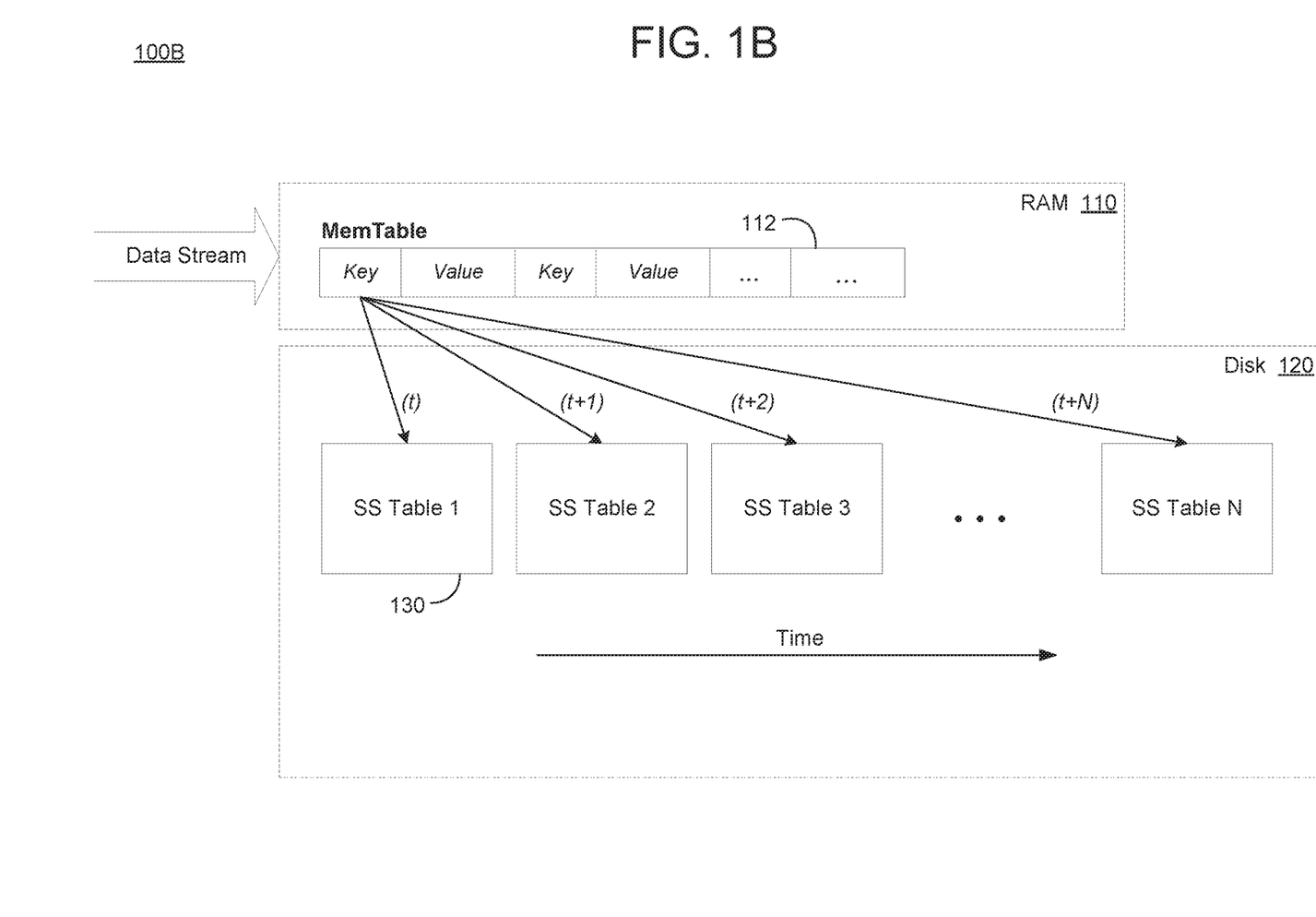
FIG. 1B is a diagram illustrating a key-value store having a log-structured merge-tree architecture according to example embodiments.
Figure 1C:
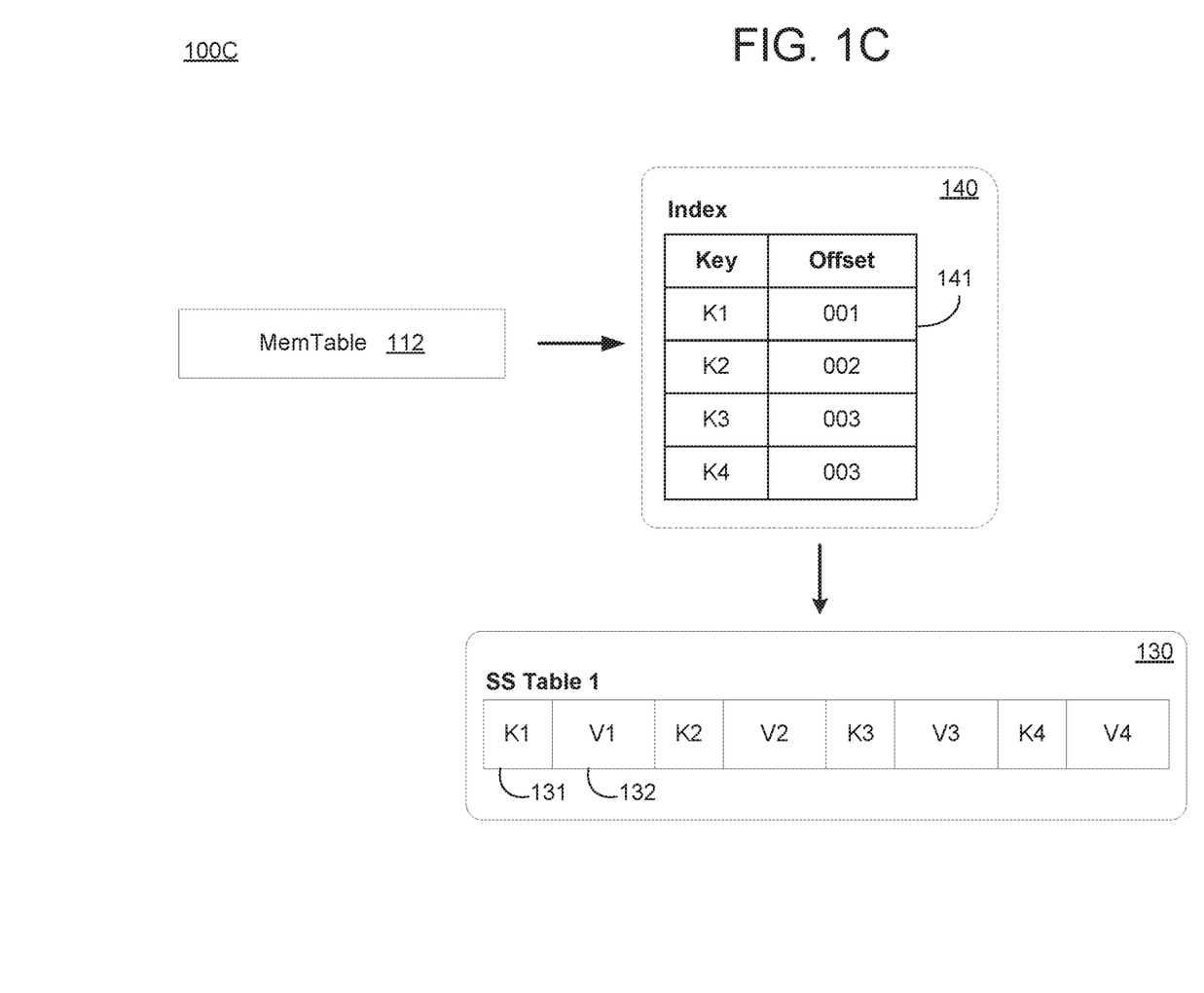
FIG. 1C is a diagram illustrating a process of transferring a memory table from RAM to disk according to example embodiments.

The disk files 11 may be sorted by an index (e.g., shown in FIG. 1C). In some cases, the disk files 11 may store overlapping content meaning that a same key value may be stored in different disk files 11 where one version of the key-value is newer than the other version(s). The database may perform a compaction process to reduce the amount of data within the disk files 11 by merging disk files 11 to create compacted files 12. The compacted files 12 may be the lowest files on the tree-like data structure. During compaction, the older versions of the key-value pairs may be deleted, while the newest version is maintained. Also, key values marked for deletion may be removed.

FIG. 1B illustrates a key-value store 100B having a log-structured merge-tree architecture according to example embodiment. Referring to FIG. 1B, the key-value store 100B includes a random access memory (RAM) 110 and a hard disk 120. An incoming stream of data from a client, application, etc., may initially be stored within a memory table 112 within the RAM 110. Data may be stored within the memory table 112 as key-value pairs. Here, the memory table 112 may have a threshold size. When the threshold size is reached, the memory table 112 may be transferred from RAM 110 to disk 120. In this example, the transfer may store the memory table 112 as a sorted string (SS) table 130 which is a file that contains a set of arbitrary, sorted key-value pairs inside. Duplicate keys are allowed within an SSTable 130. As time goes on, more SSTables 130 are created and stored within the disk 120. Each SSTable 130 stores key-value pairs in a sequence in which they are added to the SSTable 130.

FIG. 1C illustrates a process 100C of transferring the memory table 112 from RAM 110 to disk 120 according to example embodiments. The in-memory database may store multiple memory tables 112, however, for convenience one is illustrated. The memory table 112 may be converted or otherwise flushed from in-memory into the SSTable 130 when the memory table 112 reaches its threshold size. For example, the SSTable 130 may be stored in a file in which key-values are sorted based on an index such as the index 140 shown in FIG. 1C. The index 140 may include a key identifier and an offset (location) within the SSTable 130 of the key-value location. For example, a key 131 may be paired with a value 132, and may have an entry 141 in the index 140 which identifies the location of the value 132 within the SSTable 130. During a search operation, the database may perform a read operation of the index 140 to quickly retrieve a key-value from the SSTable 130.

Figure 2:
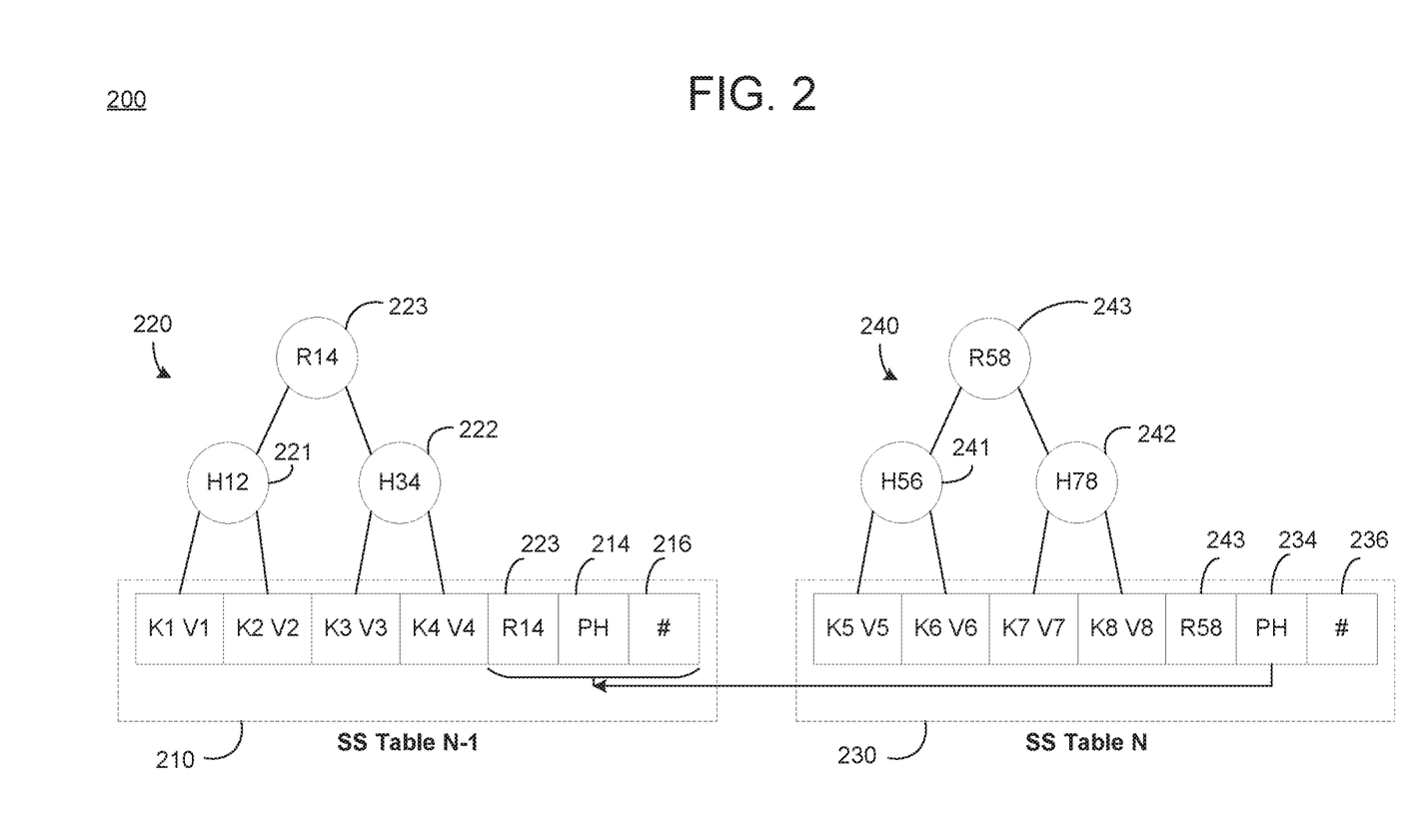
FIG. 2 is a diagram illustrating a process of generating a hash link between files in a log-structured merge-tree according to example embodiments.

FIG. 2 illustrates a process 200 of generating a hash link between files in a log-structured merge-tree according to example embodiments. Referring to FIG. 2, a first file includes an SSTable 210 and a second file includes an SSTable 230. The SSTables 210 and 230 may be sequentially created among a larger group of files. Here, the SSTable 230 is created in sequence after the SSTable 210, in time. To create cryptographic proof of the state of the SSTables 210 and 230, hash trees 220 and 240 may be generated, respectively. In this example, the hash tree 220 includes a sequence of hashes of the key-values that are stored in SSTable 210. In addition, the hash tree 240 includes a sequence of hashes of the key-values that are stored in SSTable 230. The sequence of hashes are rolled up to create a single root hash value 223 and 243, respectively.

For example, the hash tree 220 may be generated by hashing key-value content within the SSTable 210. Each key-value pair may be hashed and combined with a neighboring key-value pair. The combined hash may be rolled-up into a next level of the hash tree 220. For example, the first key-value pair (K1V1) and the second key-value pair (K2V2) in the SSTable 210 may be hashed and combined to create an intermediate hash value 221 (H12). Likewise, the third key-value pair and the fourth key-value pair in the SSTable 210 may be hashed and combined to create an intermediate hash value 222. The intermediate hash value 221 and the intermediate hash value 222 may be combined (rolled-up) to create a root hash 223 of the SSTable 210. Each layer of the tree includes half as many hashes as the previous layer. The rolling-up process may reduce hash values by combining pairs of hash values that are neighboring/adjacent to one another. The result is a root hash value 223 created from a sequence of hashes which represent the state/content of the SSTable 210.

Likewise, a hash tree 240 may be generated based on the content within the SSTable 230. Each key-value pair may be hashed and combined with a neighboring key-value pair. The combined hash may be rolled-up into a next level of the hash tree 240. For example, the fifth key-value pair (K5V5) and the sixth key-value pair (K6V6) in the SSTable 230 may be hashed and combined to create an intermediate hash value 241 (H56). Likewise, the updated seventh key-value pair and the eighth key-value pair in the SSTable 230 may be hashed and combined to create an intermediate hash value 242. The intermediate hash value 241 and the intermediate hash value 242 may be combined (rolled-up) to create a root hash 243 of the SSTable 230.

In addition to the key-value pairs, the SSTable 230 may be modified to include its own root hash value (R58) 243, a previous hash value 234, and a table number value 236 of the SSTable 230 with respect to other SSTables in the data store. For example, the previous hash value 234 may be a digest that is generated based on the root hash value 223, a previous hash value 214, and a table number value 216 of an immediately previous SSTable 210. However, the features that are used to create the previous hash 234 may be different depending on desired implementation. Thus, the use of the root hash 212, the previous hash 214, and the table number 216 to create the previous hash value 234 is for purposes of example and may differ if desired. Here, the database may concatenate the root hash 212, the previous hash 214, and the table number 216, of the SSTable 210, and perform a hash function on the concatenated values to generate the previous hash value 234.

If any value is changed from the previous SSTable 210 or any other SSTable in the chain, the previous hash value 234 will not match and the verification would fail. This creates a hash link in which the SSTable 230 points directly to the SSTable 210. Likewise, the SSTable 210 may store a previous hash value 214 created using the same data values from a previous SSTable (not shown). Thus, hash-links may be created between the SSTables in a log-structured merge-tree. By cryptographically linking the SSTables 210 and 230 together with hashes, it is possible to verify that the SSTable 230 was created after the SSTable 210. It is also possible to verify the order in which the key-value pairs within each SSTable 210 and 230 were created.

Figure 3A:
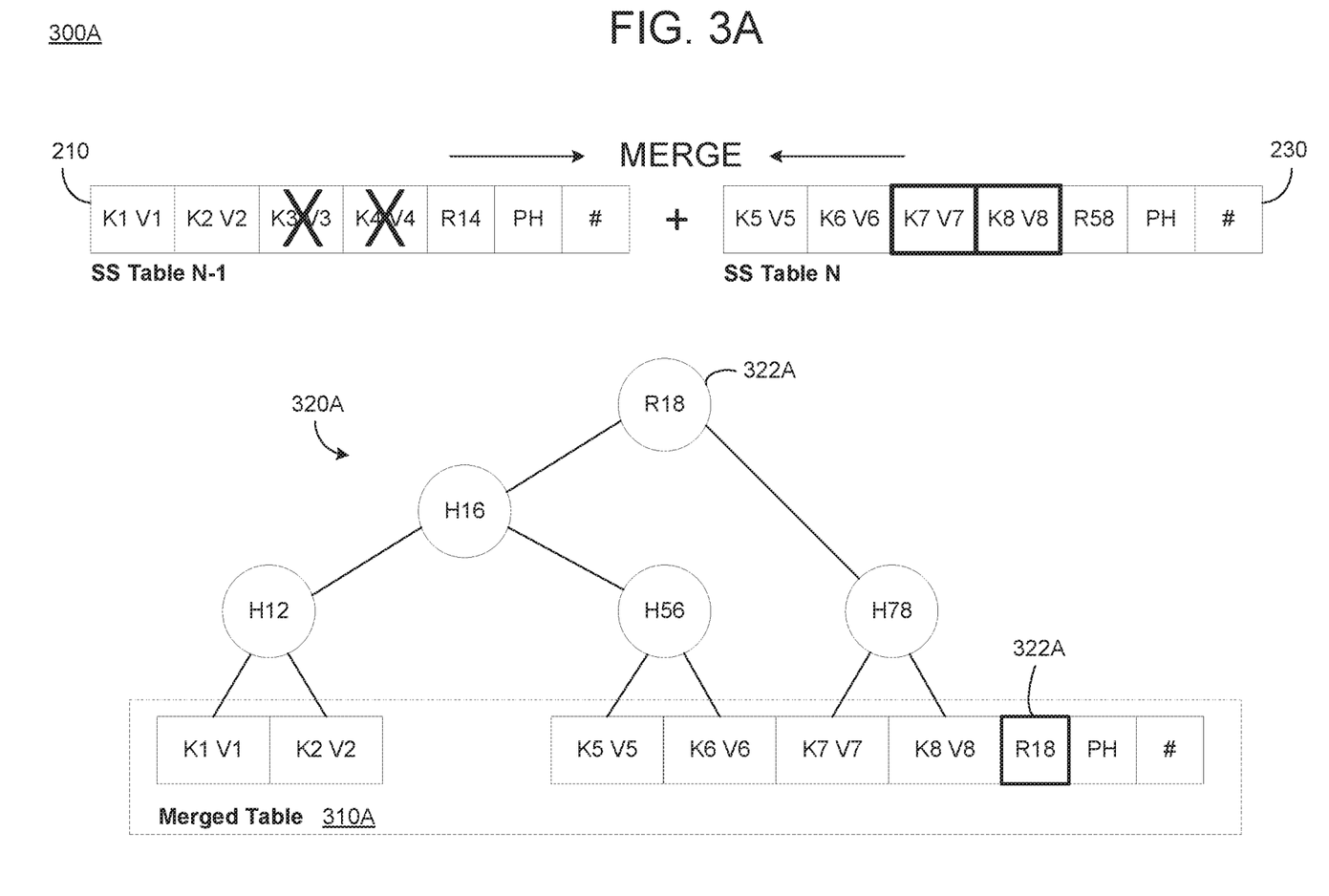
FIGS. 3A-3C are diagram illustrating a process of a merge operation in a log-structured merge-tree according to example embodiments.
Figure 3B:
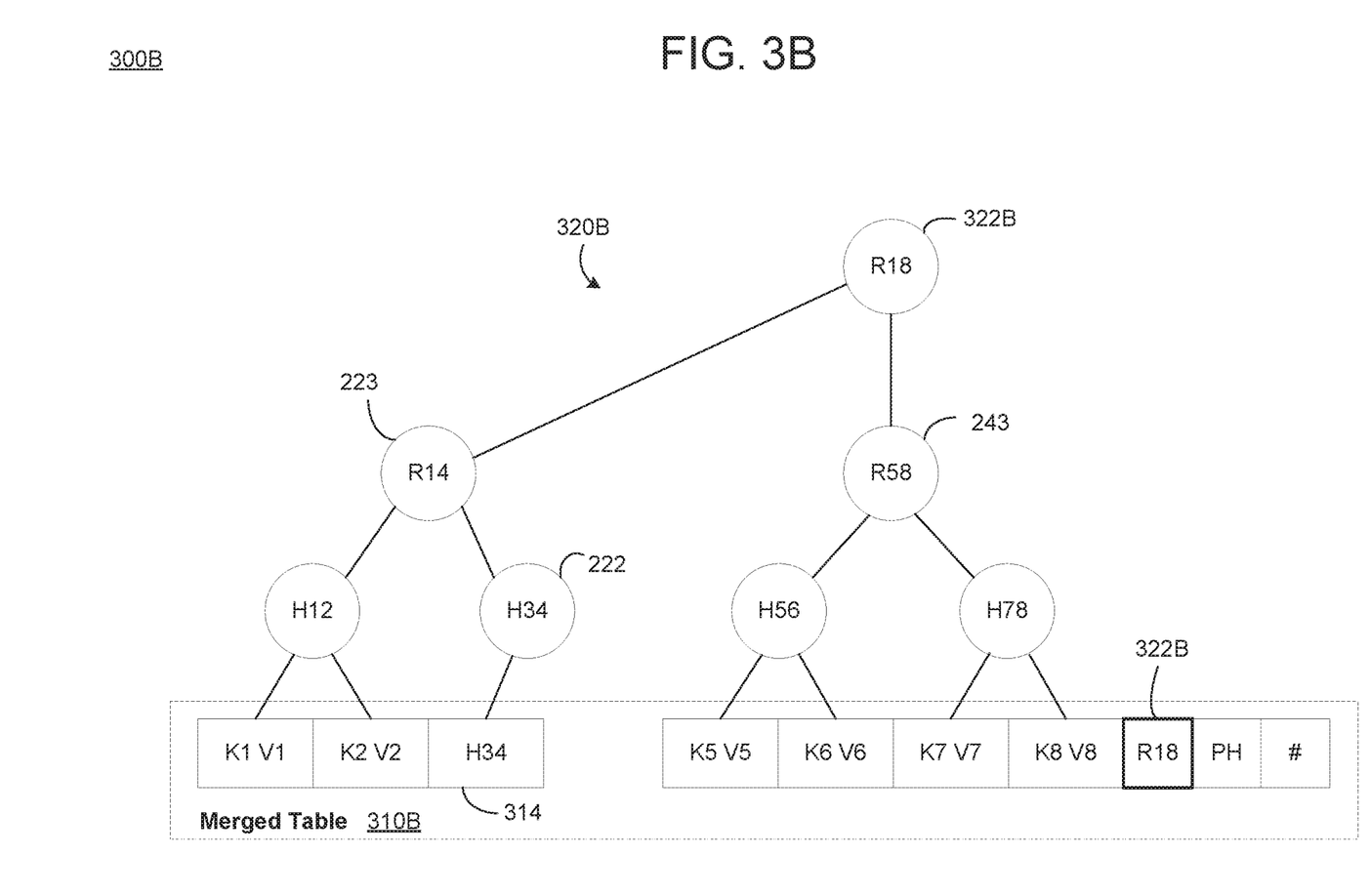
Figure 3C:
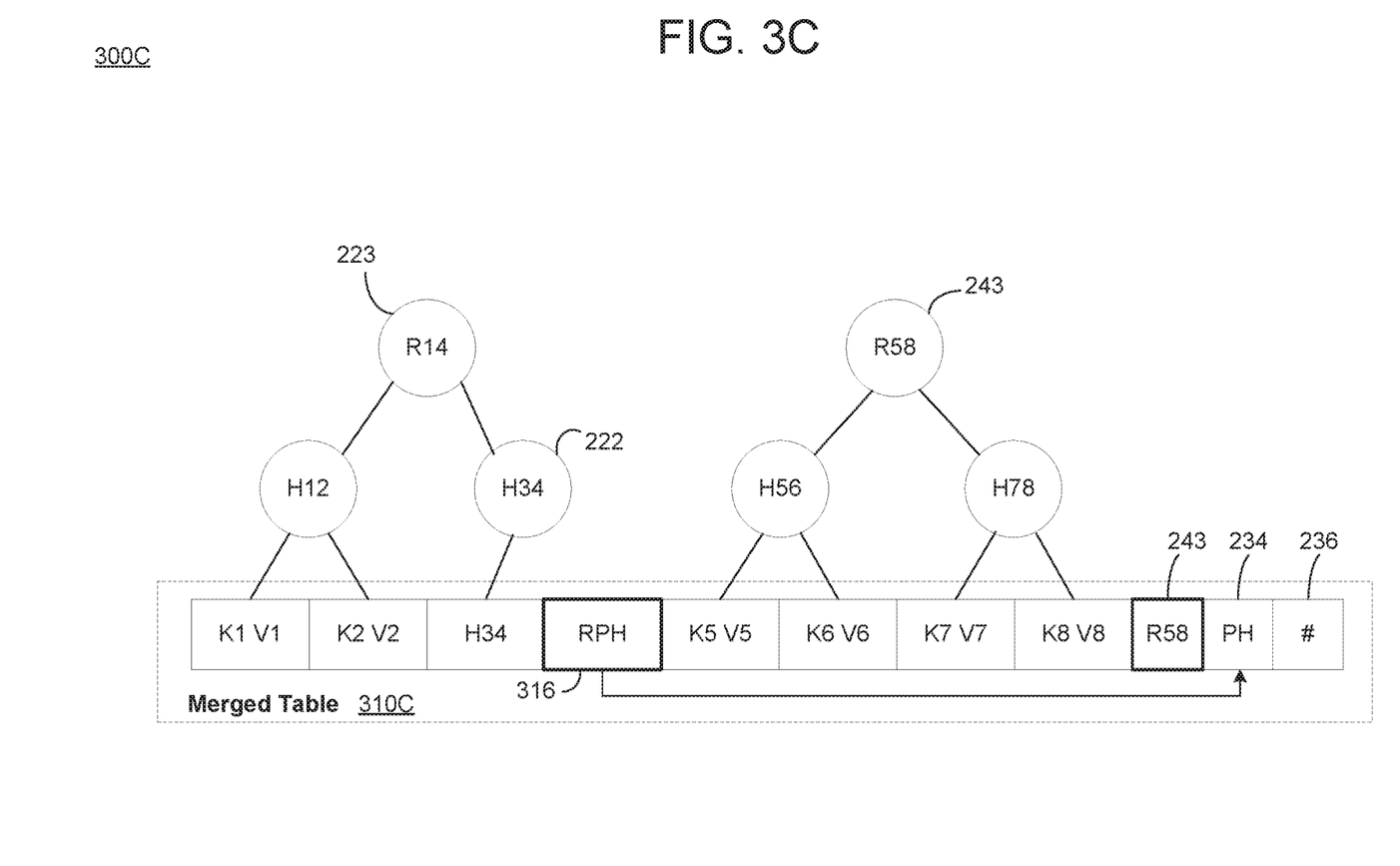

FIGS. 3A-3C illustrate a process of a merge operation being performed between two files (and the two corresponding SSTables 210 and 230). The merge operation is also referred to as compaction. In this example, the SSTables 210 and 230, shown in FIG. 2, are merged together to create a merged table 310 (or merged file). During a merge operation within a log-structured merge tree data store, a new SSTable is created and the old SSTables that are used during the merge can be removed. The new merged SSTable is thus created by merging key-value pairs from the old SSTables.

In the example of FIGS. 3A-3C, the merge operation removes the third key-value pair and the fourth key-value pair from SSTable 210 because the seventh key-value pair (in SSTable 230) is an update to the third key-value pair and the eight key-value pair (in SSTable 230) is an update to the fourth key-value pair. Thus, the prior versions of the key-value pairs can be removed during the merge operation as shown in resulting merged table 310A resulting in an increase in storage space on disk.

In order to enable cryptographic proof of the remaining content from the previous SSTables 210 and 230, the resulting merge operation must also provide a way to cryptographically prove that the key-value pairs are part of the merged table, as well as the sequential order in which the key-value pairs are stored. Different strategies may exist for generating a cryptographic hash of the merged SSTables. FIG. 3A illustrates an example of a process 300A for generating a new Merkle hash of the merged key-value pairs resulting in a root hash 322A, which may be stored in the new merged table 310A.

However, if the system were to re-compute the Merkle hash as shown in the hash tree 320A of FIG. 3A based on the merged content in the SSTable 310A, the resulting root hash value 322A would be different than the previous root hash values 223 and 243 of SSTables 210 and 230. Thus, the system would need to re-publish/re-send the new hash value 322A, previous hash, and block number, to each of the previous users/clients of the system to enable them to be able to cryptographically verify the remaining key-value pairs of data of the previous SSTables 210 and 230. This results in increased complexity and consumption or resources.

FIG. 3B illustrates a process 300B of re-using a part of the hash tree 220 and the hash tree 240 (shown in FIG. 2) of the SSTable 210 and the SSTable 230 within the hash tree 320B of the merged table 310B. Here, the intermediate hash value 222 and the root hash value 223 from the hash tree 220 of the SSTable 210 are added to the left-side of the hash tree 320B. The result is a hash value 314 being included within the merged table 310B. The system also adds the root hash 243 of the SSTable 230 to the right side of the hash tree 320B. Therefore, a newly created root hash 322B from the hash tree 320B may have an updated value with respect to the root hash 320A of FIG. 3A. However, re-publishing/re-sending of the new hash values is still required by this process 300B.

FIG. 3C illustrates a process 300C which builds a hash tree 320C which includes content of the merged table 310C that preserves the cryptographic proof of the previous SSTables 210 and 230, enabling older hash values to be used to verify the content within the new merged table 310C. In this example, the old root hash value 243 is added to the merged table 310C because the key-value pairs (K5V5-K8V8) have not changed. Furthermore, the old previous hash 234 and the old block number 236 are also added. Thus, the old root hash value 243 can be used to verify (demonstrate) that any of the key-value pairs (K5V5-K8V8) are part of the merged table 310C.

Meanwhile, to demonstrate that a previous key-value pair (e.g., K1V1 and K2V2) are part of the prior SSTable 210, the system may construct a proof value 316 based on the root hash value 223 of the SSTable 210, the previous hash value 234 of the SSTable 230, and the hash values in-between. Thus, the proof value 316 can be used to demonstrate that a remaining key-value pair (e.g., K1V1 and K2V2) resides in the merged table 310C without a need to republish a new cryptographic hash. The proof value 316 provides cryptographic proof from the root hash 223 to the previous hash value 234.

In the examples of FIGS. 3A-3C, the merge occurs between two files and two corresponding SSTables. However, it should also be appreciated that a merge may be performed between more than two files corresponding to more than two SSTables, such as three SSTables or more. In this example, the system herein may generate a new cryptographic hash that can demonstrate any remaining key value pairs reside in the merged table without the need to republish a new cryptographic hash. In addition, the new cryptographic hash can also demonstrate the order in which the three or more tables were created thereby preserving the order of the SSTables in time.

For example, when dealing with a merge that involves three or more SSTables, the resulting KV pairs from the merged SSTable can be determined first. For SSTables where all KV pairs are updated and removed by new SSTables, these values may be ignored. Then, a merging strategy may include taking two SSTables at a time and performing the merge operation shown in FIGS. 3A-3C. For example, two SSTables may be merged first. Then, the result of the merged table may be merged again with a third SSTable, and so on. As another example, a proof value (such as proof value 316 in FIG. 3C) may be constructed against the newest SSTable in the merge for each of the older SSTables. Thus, any proof value calculated for the SSTables will directly recalculate the previous hash of the resulting merged SSTable.

Figure 4:
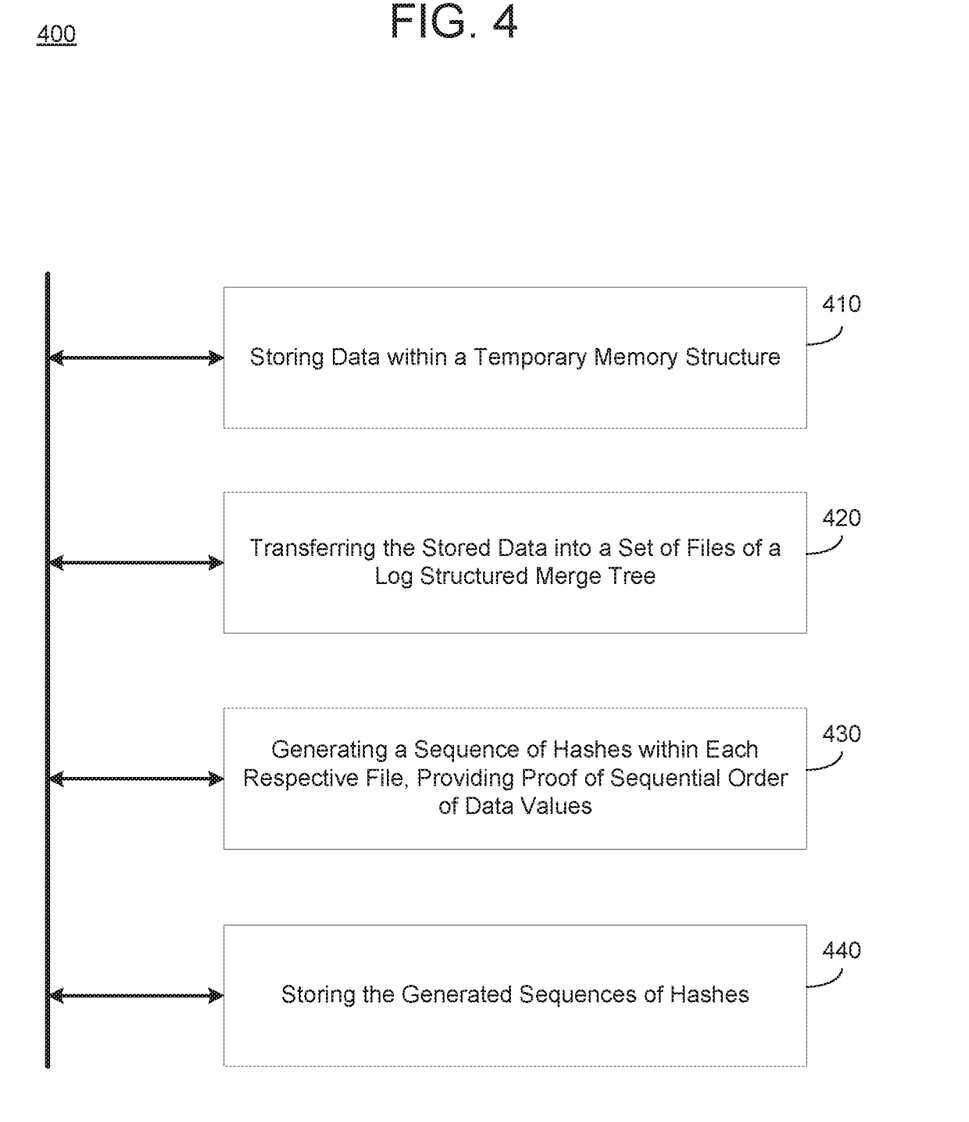
FIG. 4 is a diagram illustrating a method of hash-linking tables of a log-structured merge-tree according to example embodiments.

FIG. 4 illustrates a method 400 a method of hash-linking tables of a log-structured merge-tree according to example embodiments. For example, the method 400 may be performed by a controller, a program, a processor, a database, etc., and implemented within a key-value store or other type of data store. In 410, the method may include storing data within a temporary memory structure. For example, the temporary memory structure may include a memory table or other data structure with a threshold size. The temporary memory structure may store data in key-value pairs. The temporary memory structure may include a cache, a buffer, an array, a table, or the like.

In 420, the method may include transferring the stored data from the temporary memory structure into a set of files of a log-structured merge-tree. For example, the temporary memory structure may have a threshold size. When the threshold size is reached, the temporary memory structure may be flushed from RAM to disk. The temporary memory structure may be stored in a file. As time goes on, more files may be stored each time the temporary memory structure is flushed creating a sequence of files.

In 430, the method may include generating a respective sequence of hashes within each file of the set of files, where the respective sequence of hashes provides proof of a sequential order in which data values are stored within the respective file. In some embodiments, each respective file from the set of files stores a sequence of key-value pairs and a sequence of hashes may be generated by hashing a sequence of key-value pairs. In 440, the method may include storing the sequences of hashes in storage.

In some embodiments, the method may further include merging a first file and a second file from the set of files to create a merged file, wherein the merging may merge a first sequence of hashes of the first file and a second sequence of hashes of the second file. For example, the merging may include removing a duplicate entry of a key value from the first file based on an updated entry of the key value in the second file to create the merged file. As another example, the merging may include remove a key-value from either the first table or the second table which has been marked for delete.

In some embodiments, the merging may further include maintaining an order of the sequence of hashes. To do so, the merging may include replacing a hash value within the first sequence of hashes of the first file with an intermediate hash generated from a hash tree of the first sequence of hashes. By modifying the first sequence of hashes to include the intermediate hash of the first file, the merged sequences of hashes may maintain/preserve the order in which the key-values are sorted within the first file. In some embodiments, the merging may include replacing a hash value within the first sequence of hashes of the first file with a root hash generated from a hash tree of the second sequence of hashes. By modifying the first sequence of hashes to include the root hash of the second file, the merged sequences of hashes may maintain/preserve an order in which the two files are created.

In some embodiments, the method may further include receiving a data proof request for the merged table, and transmitting a hash value based on the first and second sequences of hashes of the first and second files. In some embodiments, the temporary memory structure may include a memory table stored in random access memory (RAM), and the set of files comprise a set of sorted string (SS) tables on disk that each store a respective flush of key value pairs from the memory table.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
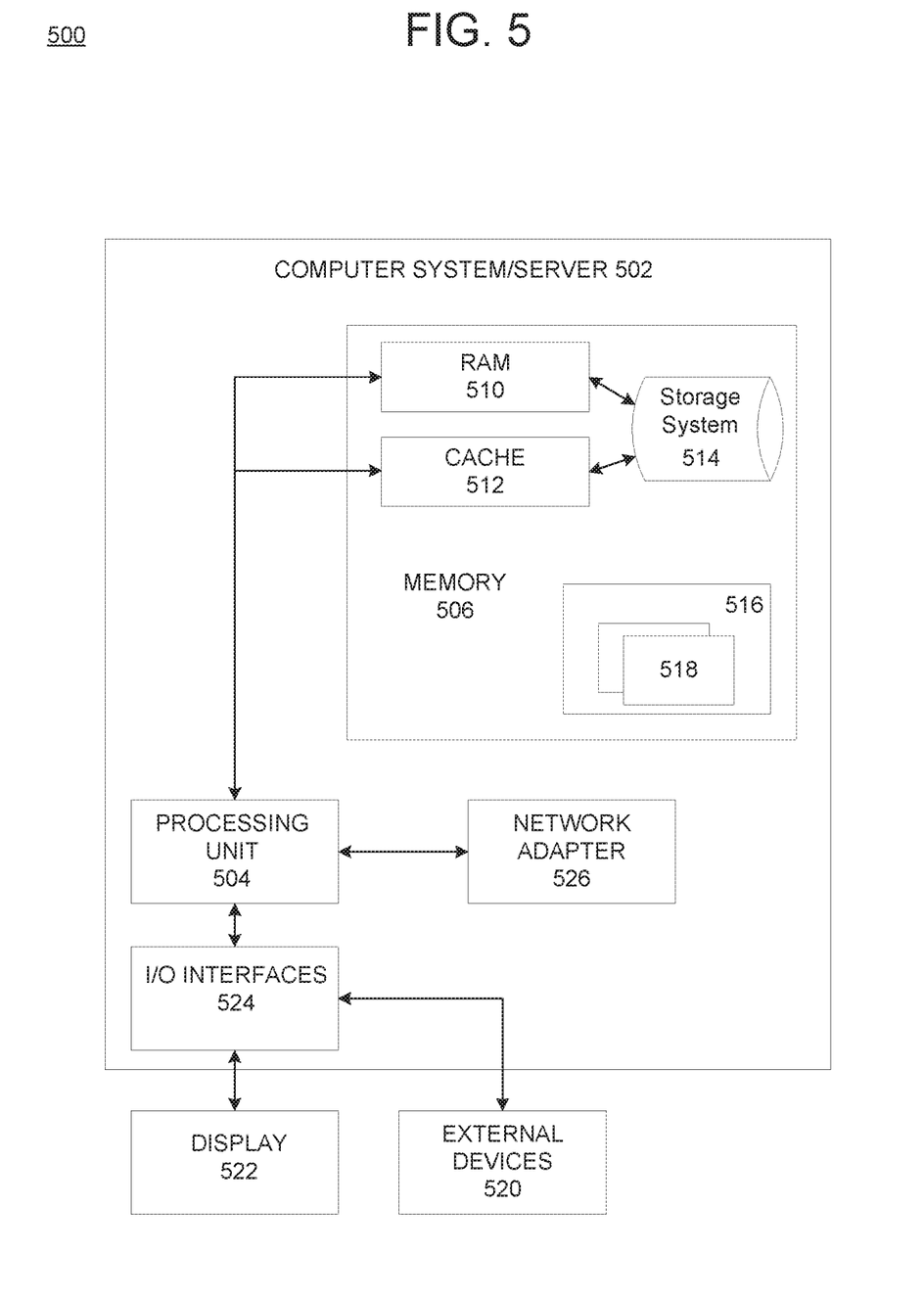
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the processor 504 may receive a request associated with a key-value pair stored in a database. In this example, the database may include a key-value database that includes a key-value store. The request may be received from an application that is connected to the computing system 502 via a network (network adapter 526). As another example, the request may be provided internally such as from the processor 504 detecting a change to a key-value pair, etc.

The processor 504 may determine whether a state of the key-value pair has changed since a most recently received request. For example, the processor 504 may compare a timestamp of a block including the key-value pair with a current timestamp associated with the key-value pair to determine whether the value of the key-value pair has changed since it was last recorded on the blockchain. In response to a determination that the state of the key-value pair has changed, the processor 504 may generate a data block that includes a changed state of the key-value pair and add the generated data block to a hash-linked chain of data blocks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
  a storage configured to store data within a temporary memory structure; and
  a processor configured to
    transfer the stored data from the temporary memory structure into a set of files of a log-structured merge-tree,
    generate a sequence of hashes of a sequence of values stored within a first file of the set of files within the log-structured merge tree, where the sequence of hashes provides proof of a sequential order in which the sequence of values are stored within the respective first file,
    store the sequences of hashes of the sequence of values of the first file in a second file of the set of files within the log-structured merge tree, and
    merge the first file and the second file to create a merged file, wherein the processor merges the sequence of hashes of the first file and a second sequence of hashes of a second sequence of values stored within the second file to create the merged file and maintains an order among the first and second sequences of hashes.

2. The apparatus of claim 1, wherein each respective file from the set of files stores a sequence of key-value pairs and a sequence of hashes generated therefrom.

3. The apparatus of claim 1, wherein the first file and the second file are received in sequential order, respectively, and the processor is configured to store a hash value generated based on a hash tree of the sequence of values within the first file as a previous hash value within the second file to cryptographically link the first and second files.

4. The apparatus of claim 1, wherein the processor is configured to remove a prior entry of a key value from the first file based on an updated entry of the key value in the second file to create the merged file.

5. The apparatus of claim 1, wherein the processor is configured to remove a hash value within the sequence of hashes of the first file and add an intermediate hash value generated from a hash tree of the sequence of hashes of the first file.

6. The apparatus of claim 1, wherein the processor is configured to remove a hash value within the sequence of hashes of the first file and add a cryptographic proof generated based on a root hash value from a hash tree of the sequence of hashes of the first file and a previous hash value of the second file.

7. The apparatus of claim 1, wherein the processor is further configured to receive a data proof request for the merged file, and transmit a hash value based on the sequence of hashes of the first file and the second sequences of hashes of the second file.

8. A method comprising:
storing data within a temporary memory structure;
transferring the stored data from the temporary memory structure into a set of files of a log-structured merge-tree;
generating a sequence of hashes of a sequence of values stored within a first file of the set of files within the log-structured merge tree, where the sequence of hashes provides proof of a sequential order in which the sequence of values are stored within the respective first file;
storing the sequences of hashes of the sequence of values of the first file in a second file of the set of files within the log-structured merge tree; and
merging the first file and the second file to create a merged file, wherein the merging comprises merging the sequence of hashes of the first file and a second sequence of hashes of a second sequence of values stored within the second file to create the merged file and maintaining an order among the first and second sequences of hashes.

9. The method of claim 8, wherein each respective file from the set of files stores a sequence of key-value pairs and a sequence of hashes generated therefrom.

10. The method of claim 8, wherein the first file and the second file are received in sequential order, respectively, and the method further comprises storing a hash value generated based on a hash tree of the sequence of values within the first file as a previous hash value within the second file to cryptographically link the first and second files.

11. The method of claim 8, wherein the merging comprises removing a prior entry of a key value from the first file based on an updated entry of the key value in the second file to create the merged file.

12. The method of claim 8, wherein the merging comprises removing a hash value within the sequence of hashes of the first file and adding an intermediate hash value generated from a hash tree of the sequence of hashes of the first file.

13. The method of claim 8, wherein the merging comprises removing a hash value within the sequence of hashes of the first file and adding a cryptographic proof generated based on a root hash value from a hash tree of the sequence of hashes of the first file and a previous hash value of the second file.

14. The method of claim 8, further comprising receiving a data proof request for the merged file, and transmitting a hash value based on the sequence of hashes of the first file and the second sequences of hashes of the second file.

15. A non-transitory computer readable medium comprising instructions, that when read by a processor, cause the processor to perform a method comprising:
storing data within a temporary memory structure;
transferring the stored data from the temporary memory structure into a set of files of a log-structured merge-tree;
generating a sequence of hashes of a sequence of values stored within a file of the set of files within the log-structured merge tree, where the sequence of hashes provides proof of a sequential order in which the sequence of values are stored within the respective first file;
storing the sequences of hashes of the sequence of values of the first file in a second file of the set of files within the log-structured merge tree; and
merging the first file and the second file to create a merged file, wherein the merging comprises merging the sequence of hashes of the first file and a second sequence of hashes of a second sequence of values stored within the second file to create the merged file and maintaining an order among the first and second sequences of hashes.

16. The non-transitory computer readable medium of claim 15, wherein each respective file from the set of files stores a sequence of key-value pairs and a sequence of hashes generated therefrom.

17. The non-transitory computer readable medium of claim 15, wherein the first file and the second file are received in sequential order, respectively, and the method further comprises storing a hash value generated based on a hash tree of the first file as a previous hash value within the second file to cryptographically link the first and second files.

* * * * *